Dec. 11, 1951  K. P. BILLNER  2,578,220
HANDLING APPARATUS
Filed Feb. 1, 1950  2 SHEETS—SHEET 1
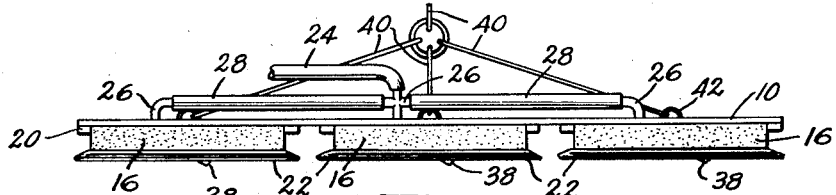
Fig. 1
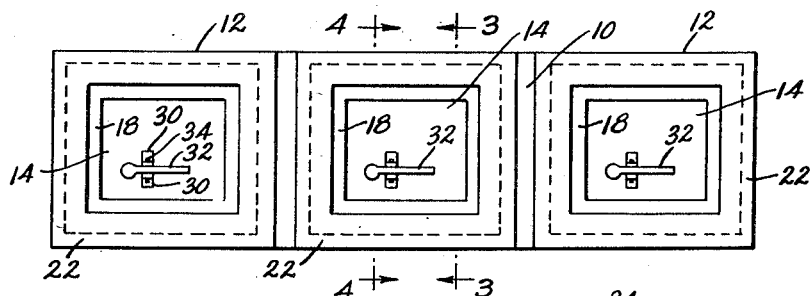
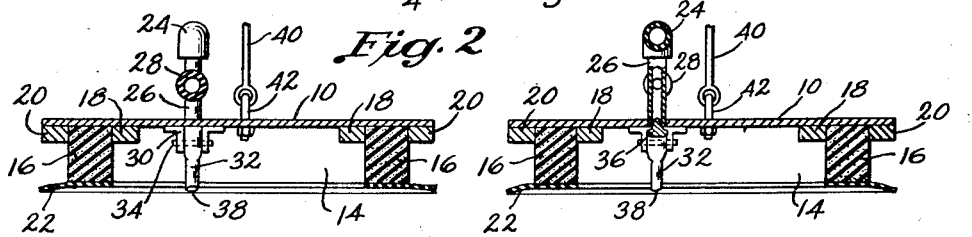
Fig. 3  Fig. 4
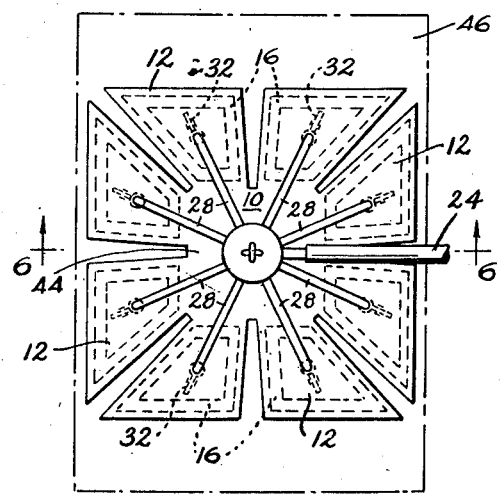
Fig. 5
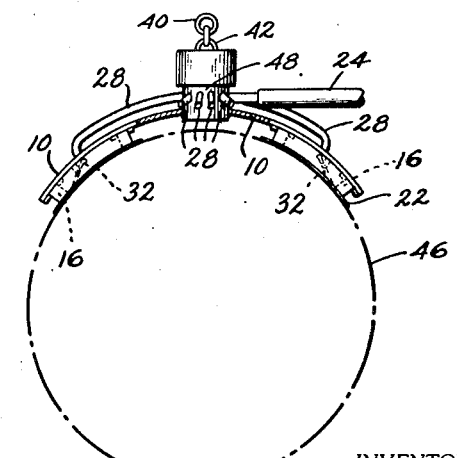
Fig. 6
INVENTOR
KARL P. BILLNER,
BY Raymond W. Colton
ATTORNEY Dec. 11, 1951 K. P. BILLNER 2,578,220
HANDLING APPARATUS
Filed Feb. 1, 1950 2 SHEETS—SHEET 2
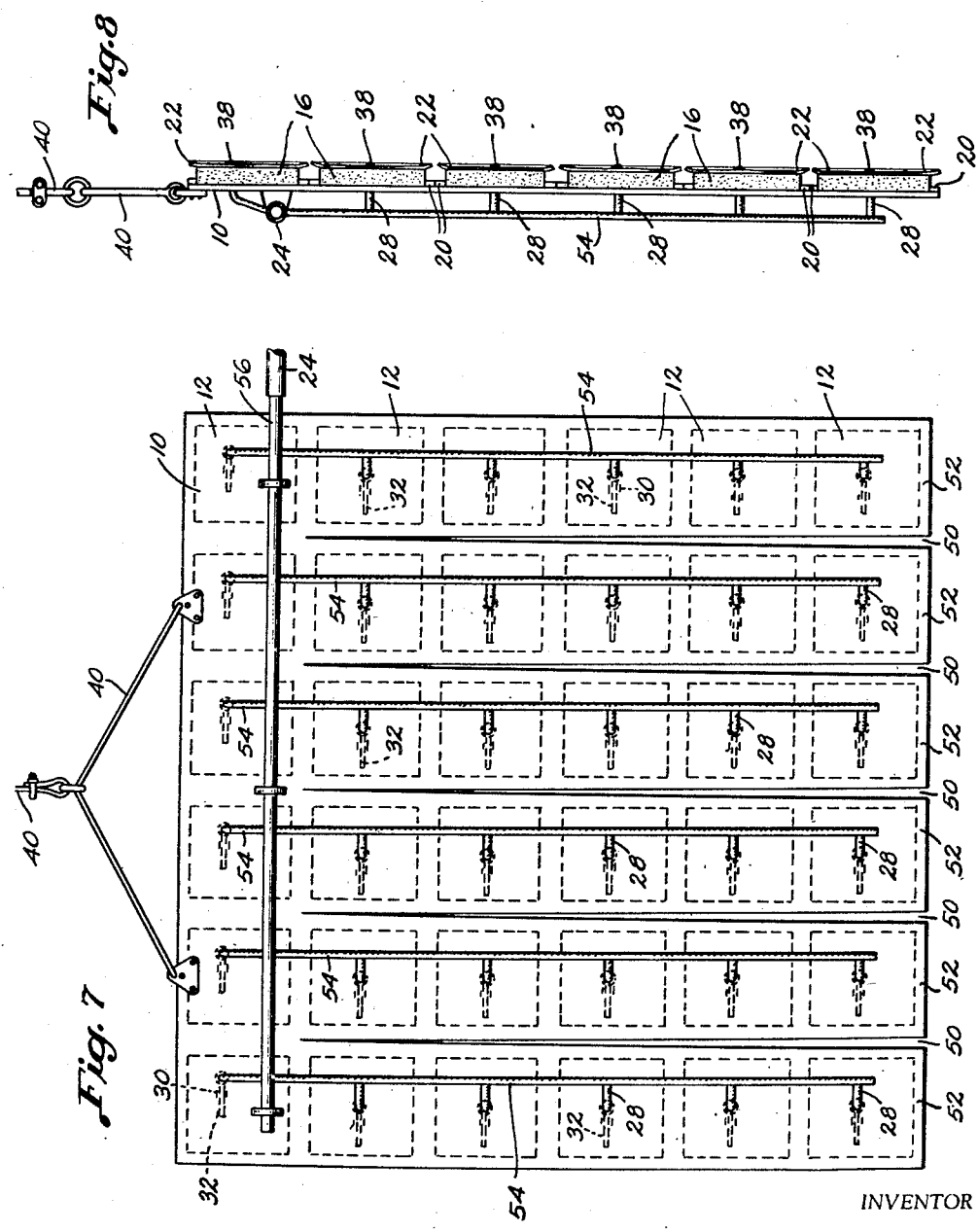
INVENTOR
KARL P. BILLNER,
BY Raymond W Colton
ATTORNEY Patented Dec. 11, 1951

2,578,220

UNITED STATES PATENT OFFICE 2,578,220

HANDLING APPARATUS

Karl P. Billner, Philadelphia, Pa., assignor to Vacuum Concrete, Inc., a corporation of Pennsylvania Application February 1, 1950, Serial No. 141,747

14 Claims. (Cl. 294—65)

This invention relates to handling apparatus utilizing the principle of providing reduced pressures between bodies so as to use the force of atmosphere to secure the bodies together.

The preferred form of the present invention contemplates a portable handling implement comprising a plurality of interconnected hollow mats defining chambers having open ends, a deformable work engaging and sealing gasket secured at the open end of each of the chambers, conduit means communicating with each of the chambers for exhausting fluid therefrom, the conduit means communicating with the respective chambers by means of control valves, and an actuator connected with the valve of each chamber projecting beyond the gaskets sufficiently to engage a work surface and open its valve. Each valve is preferably biased towards its closed position under the effect of the reduced pressure in the conduit means. The deformable work engaging and sealing gasket is preferably of resilient compressible material, such as a self-supporting expanded rubber composition. A limp sealing flap preferably extends beyond the gasket for each chamber to establish a preliminary seal with a work surface.

When the handling implement of the present invention is to be used in conjunction with surfaces which are not plane or substantially so, a flexible frame may be used to support the hollow mats, in which case, the frame may be resilient so as to return to its original shape after it has been released from a non-planar work surface. The interconnected hollow mats may be flexibly attached to a frame for relative movement with respect thereto, and such mats may be interconnected with the frame and depend therefrom. The mats may be radially disposed with respect to the frame, and in any case, the mats are adapted for sequential engagement with a work surface. Flexible connections will be provided in the conduit means to permit relative movement of the mats.

Each of the actuators preferably has a mechanical advantage greater than unity so that upon its initial engagement with a work surface, its valve will be opened but slightly until a sufficient seal has been established between the work and chamber defined by its hollow mat, thus eliminating needless leaks. The valves may be contained within the chambers themselves, and the actuators pivoted so as to provide a longer lever arm between the fulcrum and the work engaging portion than that between the fulcrum and the valve itself.

A more complete understanding of the invention will follow from a description of the accompanying drawings wherein:

Fig. 1 is an elevation depicting one form of the invention;

Fig. 2 is a bottom plan view of the apparatus shown in Fig. 1;

Fig. 3 is a section taken along line 3—3 of Fig. 2;

Fig. 4 is a section taken along line 4—4 of Fig. 2;

Fig. 5 is a top plan view of the modification;

Fig. 6 is a section taken along line 6—6 of Fig. 5;

Fig. 7 is a side elevation of a modification; and

Fig. 8 is an end elevation of the modification shown in Fig. 7.

The apparatus depicted in Fig. 1 comprises a frame 10 whose spaced portions serve as a wall of each of a plurality of hollow mats 12 having chambers 14 defined by deformable work engaging and sealing gaskets 16 suitably secured to the frame 10, by adhesive or otherwise, and positioned against transverse movements with respect thereto by inner and outer locating strips 18 and 20 respectively, which strips are sufficiently short or otherwise appropriately formed, so that in their assembled positions, they have no stiffening effect upon the frame. Secured to the surfaces of the gaskets 16 remote from the frame 10, limp sealing flaps 22 are provided, projecting peripherally beyond the gaskets to establish a preliminary seal between the chamber which is equipped therewith and a work surface to be engaged.

A hose line 24 has an end, not shown, connected with a source of reduced pressure, such as a vacuum pump, its other end being connected with fittings 26, through suitable flexible conduits 28 to provide communication with the chambers 14 defined by the respective mats 12. Secured to the frame 10, within each of the chambers 14, are a pair of brackets 30 supporting a lever 32 by means of a pivot pin 34. The lever is pivoted to provide unequal lever arms, the shorter one carrying a valve 36 for closing its chamber with respect to the reduced pressure source, the longer lever arm terminating in a free end 38 extending slightly below the surface of the limp flap 22 when the valve 36 is in its closed position with respect to the fitting 26 which provides a seat for the valve.

The frame is raised and lowered by means of suitable cables or chains 40 secured to the frame 10 by means of rings 42, or in any other convenient manner.

In operation, the apparatus depicted in Fig. 1 will be lowered into contact with a work surface, the first of the mats 12 to engage the surface having the free end 38 of its valve lever 32 displaced slightly upon contact with the work surface, slightly opening the valve 36 with respect to its seat, communicating the chamber 14 with the reduced pressure source. The limp flap 22 of this chamber will quickly produce a seal with the work surface, tending to move the particular mat and work surface closer together under the effects of atmospheric pressure as the chamber becomes more and more exhausted. As this relative movement occurs, compressing the gaskets 16, which are suitably composed of self-supporting expanded rubber, such as sponge rubber, the lever 32 will continue to become displaced until the valve 36 has completely uncovered its port. As the first mat to engage the work surface is undergoing the relative movement thus described, the next adjacent mat or mats will likewise be biased towards the work surface until the lever arm or arms 32 of the adjacent chamber or chambers 14 establishes communication with the source of reduced pressure as well. In this way, handling apparatus involving any number of such mats, suitably interconnected, will experience successive engagement of the mats in an automatic fashion until the entire number of such mats engageable with the work surface have effected their seals and secured themselves to the work.

Since such a great number of applications for which the present invention is intended involve work surfaces which are not planar, it is preferable that the mats for such applications be relatively movable with respect to one another, which can be accomplished by suitable articulation or interconnection through a frame of flexible and preferably resilient material, such as sheet steel or proper gauge.

A modification of the invention has been depicted in Figs. 5 and 6 wherein the frame 10 comprises a central web of material 44 from which a plurality of mats 12 radiate, each of the mats being movable with respect to the web and with respect to one another, enabling the apparatus to be applied to curved objects such as the cylindrical surface 46 depicted in broken lines in these figures. Each of the mats has its chamber in communication with a source of reduced pressure when the lever 32 controlling its valve has been displaced by contact with the work surface. The communication is established through flexible hose lines 28 communicating through a central manifold 48 with a hose line 24 as in the preceding modification.

It will readily follow that when the apparatus depicted in Figs. 5 and 6 is lowered by means of its chain 40 into contact with the work surface 46, one of the mats 12 will have its lever 32 displaced by contact with the surface, whereupon its chamber will begin to become exhausted, increasing the movement of the mat towards the work surface until one or more adjacent mats will likewise have their levers 32 displaced to effect progressive gripping of the work surface by all of the mats which establish sealing engagement with the surface.

Once the apparatus has become secured to the work, suitable lifting movements can be transmitted to the chains or cables to shift or transport the work to any desired new positions.

A further modification has been shown in Figs. 7 and 8 of the drawings wherein the frame 10, as shown in Fig. 7, contains a plurality of downwardly divergent slits 50 defined by dependent skirts 52 made up of interconnected mats 12, each provided with a valve and actuator 32 as in the previous cases, to communicate the chamber of each mat with a source of reduced pressure through flexible connections 28, which communicate with flexible hose lines 54 which are in turn, connected with a manifold 56 to which the hose line 24 is joined. When a construction of this kind is employed for lifting, its upper row of mats 12, illustrated by the uppermost row shown in Fig. 7, will begin to engage the surface, such as that of a submarine vessel, or in fact, any irregular body to be lifted, whereupon, the upper portion of the assembly will begin to conform itself to the surface of the work as each of the levers of the upper row of mats is deflected to communicate its respective chamber with the source of reduced pressure. Then, progressively, the mats of the lower rows will undergo a similar effect so that the mats of the second row from the top will begin to engage the surface, and so on, until the last of the mats on the lowest rows engageable with the surface secures itself to the work surface. It will readily follow, that this apparatus tends to wind itself about a curved object, making it possible to effect salvage operations, for example, with facility. Where the apparatus is used under water, it will follow that the gripping force will be increased by the hydrostatic head involved, over that experienced where the apparatus is used under atmospheric conditions.

Whereas only a few typical embodiments of the invention have been illustrated for purposes of description, the invention should not be confined thereto beyond the scope of the appended claims.

I claim:

1. A portable handling implement comprising a plurality of hollow mats defining chambers having open ends, a frame interconnecting said mats and transmitting movement from one of said mats to a mat adjacent thereto, a deformable work engaging and sealing gasket secured at the open end of each of said chambers, conduit means communicating with each of said chambers for exhausting fluid therefrom, said conduit means containing a control valve for each chamber, each valve being biased towards its closed position by reduced pressure in said conduit means, and an actuator connected with the valve of each chamber projecting beyond the gasket thereof for opening its valve upon contact with a work surface.

2. A portable handling implement comprising a plurality of hollow mats defining chambers having open ends, a frame interconnecting said mats and transmitting movement from one of said mats to a mat adjacent thereto, a resilient compressible work engaging and sealing gasket secured at the open end of each of said chambers, conduit means communicating with each of said chambers for exhausting fluid therefrom, said conduit means containing a control valve for each chamber, and an actuator connected with the valve of each chamber projecting beyond the gasket thereof for opening its valve upon contact with a work surface.

3. A portable handling implement comprising a plurality of hollow mats defining chambers having open ends, a frame interconnecting said mats and transmitting movement from one of said mats to a mat adjacent thereto, a self-supporting expanded rubber work engaging and sealing gasket secured at the open end of each of said chambers, conduit means communicating with each of said chambers for exhausting fluid therefrom, said conduit means containing a control valve for each chamber, and an actuator connected with the valve of each chamber projecting beyond the gasket thereof for opening its valve upon contact with a work surface.

4. A portable handling implement comprising a plurality of hollow mats defining chambers having open ends, a frame interconnecting said mats and transmitting movement from one of said mats to a mat adjacent thereto, a deformable work engaging and sealing gasket secured at the open end of each of said chambers, a limp sealing flap extending beyond the gasket for each chamber to establish a preliminary seal with a work surface, conduit means communicating with each of said chambers for exhausting fluid therefrom, said conduit means containing a control valve for each chamber, and an actuator connected with the valve of each chamber projecting beyond the gasket thereof for opening its valve upon contact with said work surface.

5. A portable handling implement comprising a flexible frame, said frame supporting a plurality of interconnected hollow mats defining chambers having open ends, said frame transmitting movement from one of said mats to a mat adjacent thereto, a deformable work engaging and sealing gasket secured at the open end of each of said chambers, conduit means communicating with each of said chambers for exhausting fluid therefrom, said conduit means containing a control valve for each chamber, and an actuator connected with the valve of each chamber projecting beyond the gasket thereof for opening its valve upon contact with a work surface.

6. A portable handling implement comprising a flexible resilient frame, a plurality of interconnected hollow mats carried by said frame and defining chambers having open ends, said frame transmitting movement from one of said mats to a mat adjacent thereto, a deformable work engaging and sealing gasket secured at the open end of each of said chambers, conduit means communicating with each of said chambers for exhausting fluid therefrom, said conduit means containing a control valve for each chamber, and an actuator connected with the valve of each chamber projecting beyond the gasket thereof for opening its valve upon contact with a work surface.

7. A portable handling implement comprising a plurality of hollow mats defining chambers having open ends, a frame interconnecting said mats and transmitting movement from one of said mats to a mat adjacent thereto, a deformable work engaging and sealing gasket secured at the open end of each of said chambers, conduit means communicating with each of said chambers for exhausting fluid therefrom, said conduit means containing a control valve for each chamber, and an actuator connected with the valve of each chamber projecting beyond the gasket thereof for opening its valve upon contact with a work surface.

8. A portable handling implement comprising a frame, a plurality of hollow mats defining chambers having open ends flexibly attached to said frame for relative movement with respect thereto, means interconnecting adjacent mats and transmitting movement therebetween, a deformable work engaging and sealing gasket secured at the open end of each of said chambers, conduit means communicating with each of said chambers for exhausting fluid therefrom, said conduit means containing a control valve for each chamber, and an actuator connected with the valve of each chamber projecting beyond the gasket thereof for opening its valve upon contact with a work surface.

9. A portable handling implement comprising a frame, a plurality of hollow mats interconnected with said frame and depending therefrom and defining chambers having open ends, a deformable work engaging and sealing gasket secured at the open end of each of said chambers, conduit means communicating with each of said chambers for exhausting fluid therefrom, said conduit means containing a control valve for each chamber, and an actuator connected with the valve of each chamber projecting beyond the gasket thereof for opening its valve upon contact with a work surface.

10. A portable handling implement comprising a frame, a plurality of hollow mats carried by said frame and radially disposed with respect thereto and defining chambers having open ends, a deformable work engaging and sealing gasket secured at the open end of each of said chambers, conduit means communicating with each of said chambers for exhausting fluid therefrom, said conduit means containing a control valve for each chamber, and an actuator connected with the valve of each chamber projecting beyond the gasket thereof for opening its valve upon contact with a work surface.

11. A portable handling implement comprising a frame supporting a plurality of hollow mats defining chambers having open ends, portions of said frame interconnecting said mats and transmitting relative movement between adjacent mats for sequential engagement with a work surface, a deformable work engaging and sealing gasket secured at the open end of each of said chambers, conduit means communicating with each of said chambers for exhausting fluid therefrom, said conduit means containing a control valve for each chamber, and an actuator connected with the valve of each chamber projecting beyond the gasket thereof for opening its valve upon contact with said work surface.

12. A portable handling implement comprising a plurality of flexibly hollow mats defining chambers having open ends, a frame interconnecting said mats and transmitting movement from one of said mats to a mat adjacent thereto, a deformable work engaging and sealing gasket secured at the open end of each of said chambers, conduit means including flexible connections communicating with each of said chambers for exhausting fluid therefrom, said conduit means containing a control valve for each chamber, and an actuator connected with the valve of each chamber projecting beyond the gasket thereof for opening its valve upon contact with a work surface.

13. A portable handling implement comprising a plurality of hollow mats defining chambers having open ends, a frame interconnecting said mats and transmitting movement from one of said mats to a mat adjacent thereto, a deformable work engaging and sealing gasket secured at the open end of each of said chambers, conduit means communicating with each of said chambers for exhausting fluid therefrom, each of said chambers containing a control valve for said conduit means, and an actuator connected with the valve of each chamber projecting beyond the gasket thereof for opening its valve upon contact with a work surface.

14. A portable handling implement comprising a plurality of hollow mats defining chambers having open ends, a frame interconnecting said mats and transmitting movement from one of said mats to a mat adjacent thereto, a deformable work engaging and sealing gasket secured at the open end of each of said chambers, conduit means communicating with each of said chambers for exhausting fluid therefrom, a valve for controlling communication between said conduit means and each of said chambers, and an actuator having a mechanical advantage greater than unity connected with the valve of each chamber projecting beyond the gasket thereof for opening its valve upon contact with a work surface.

KARL P. BILLNER.

REFERENCES CITED

The following references are of record in the file of this patent:

UNITED STATES PATENTS

| Number | Name | Date |
| --- | --- | --- |
| 1,130,679 | Staunton | Mar. 2, 1915 |
| 1,311,776 | Rodriguez | July 29, 1919 |
| 2,016,814 | Ferguson | Oct. 8, 1935 |
| 2,207,492 | Spiess | July 9, 1940 |
| 2,253,283 | Minaker | Aug. 19, 1941 |